Sept. 30, 1930.　　　R. E. LASLEY　　　1,777,097
POWER PLANT
Filed Feb. 19, 1925　　　3 Sheets-Sheet 1

Inventor
R. E. Lasley.

By
Lacey & Lacey, Attorneys

Sept. 30, 1930.  R. E. LASLEY  1,777,097
POWER PLANT
Filed Feb. 19, 1925   3 Sheets-Sheet 2

Sept. 30, 1930.  R. E. LASLEY  1,777,097
POWER PLANT
Filed Feb. 19, 1925   3 Sheets-Sheet 3

Inventor
R. E. Lasley.
By
Lacey & Lacey, Attorneys

Patented Sept. 30, 1930

1,777,097

UNITED STATES PATENT OFFICE

ROBERT E. LASLEY, OF WAUKEGAN, ILLINOIS, ASSIGNOR OF ONE-FIFTH TO MARVIN C. TONGER, OF ODELL, ILLINOIS

POWER PLANT

Application filed February 19, 1925. Serial No. 10,368.

The purpose of the present invention is to provide an economical and highly efficient power plant which may be either stationary or utilized in propelling locomotives, automobiles, aeroplanes, boats, etc.

One of the objects of the present invention is to provide a power plant for the utilization of the energy of burning fuel and to embody in the plant means for generating a motive fuel and employing the same in operating a turbine from which power may be taken.

Another object of the invention is to provide for the utilization of the heat units from the exhaust motive fluid in assisting in the generation of fresh motive fluid, thereby eliminating waste of heat units and increasing the efficiency of the plant.

Another object of the invention is to provide means whereby a highly combustible fuel may be safely consumed to produce energy to operate the turbine referred to and without likelihood of explosion of the fuel or spontaneous combustion thereof.

Another object of the invention is to provide, in a power plant of the type outlined, means whereby suitable motive fluid may be generated at a low cost and with safety, and fuel may be burned under conditions such as to obtain therefrom the maximum energy for the purpose of operating the turbine.

Another object of the invention is to provide means whereby the generation of motive fuel may be effected and controlled in accordance with varying conditions and with minimum waste.

The power unit of the plant comprises a turbine which is indicated in general by the numeral 1 and is housed within a casing indicated in general by the numeral 2. The turbine casing is provided with an inlet 3 which is restricted as at 4, to substantially the form of a Venturi tube or passage, the inlet 3 extending circumferentially about the wall of the casing and communicating with the rotor housing 5 of the casing by way of an opening 6. The rotor housing 5 is interiorly cylindrical and an annular baffle 7 is arranged within the housing midway between the ends thereof and is provided with laterally disposed rims 8 which peripherally support a series of baffle vanes indicated by the numeral 9. It will be observed by reference to Figure 2 of the drawings, that the vanes 9 are located at opposite sides of the intake of the turbine and that a shaft 10 is journaled for rotation axially within the rotor casing or housing 5. The rotor proper comprises two blade carrying discs arranged at each side of the member 7 and fixed upon the shaft 10, one disc of each pair or set being indicated by the numeral 11 and the other by the numeral 12. Each disc 11 carries, upon its periphery, a series of blades indicated by the numeral 13 which will presently be more specifically described. The numeral 14 indicates an annular vane supporting member which is arranged within the rotor housing 5, one of these members being located between each set of the discs 11 and 12 and carrying a peripheral series of vanes indicated by the numeral 15. Each rotor disc 12 carries a peripheral series of blades 16 and by reference to Figure 10 of the drawings, it will be observed that these blades are to pass the vanes 15 in the rotation of the rotor discs. As will be observed by reference to Figure 7 of the drawings, which figure illustrates schematically the arrangement of the blades and vanes of the turbine, the vanes 9 are of greater thickness at their edges which are presented toward the intake of the turbine than at their opposite edges, being gradually thinned in the latter direction, so that the motive fluid, generated in a manner to be presently explained, entering between relatively adjacent ones of the blades will be permitted to expand before it reaches the blades 13. The vanes 9 are disposed obliquely with their thinner edges presented in the general direction of rotation of the rotor and it will be observed that the blades 13 which are carried by the rotor discs 11, are oppositely disposed so that their receding sides are presented obliquely toward the spaces between the thinner edges of the vanes 9. It will likewise be observed that the blades 13 are of greater thickness at their edges which are next adjacent the vanes 9 than at their opposite edges and are gradually thinned and transversely curved in the direction of their latter edges. By thus forming the blades 13, the space between their thinner edges is of greater width than the space between their thicker edges and, therefore, the motive fluid is permitted to further expand as it leaves the spaces between relatively adjacent blades. The vanes 15, as in the case of the vanes 9, are obliquely disposed and at substantially corresponding angles, but unlike the vanes 9, they are transversely curved in cross section, their concave sides being presented in the general direction of rotation of the rotor. As in the case of the vanes 9, however, the vanes 15 are of greater thickness at their edges which are next adjacent the blades 13, and are of gradually decreasing thickness in the direction of their opposite edges. The blades 16 upon the rotor discs 12 are arranged directly transversely of the peripheries of the respective discs and are transversely curved and in cross section are substantially crescent-shaped, their concave sides being presented in a direction the opposite of that in which the rotor rotates. It will be observed by reference to Figures 2 and 7 of the drawings, that, in the rotation of the rotor, the blades 13 pass between the series of vanes 9 and 15 with their edges relatively close to the adjacent vanes and that, in like manner, the pockets 16 pass the thinner edges of the vanes 15. The motive fluid takes the course indicated by the arrows in Figure 10, and it will be evident that the fluid is permitted to expand as it leaves the space between two adjacent ones of the vanes 9, again expanding as it leaves the space between the thinner edges of the blades 13, and further expanding as it leaves the space between the thinner edges of the vanes 15. It will also be evident at this point that due to the oblique disposition of the vanes 9 and 15 and the reverse oblique disposition of the blades 13 and transverse disposition of the blades 16, the energy of the motive fluid is most effectually utilized.

The exhaust motive fluid is delivered into exhaust chambers 17 within the turbine casing at opposite sides of the rotor housing and out through an exhaust conduit 18 which opens through the bottom of the said casing, the space immediately above the bottom and beneath the rotor housing being enclosed to provide a chamber 19 in which certain coils of the motive fluid generating apparatus are located as will be presently explained.

The power plant embodying the invention includes, in addition to the turbine just described, an apparatus for generating the motive fluid, and a combustion unit in which the fluid is consumed, this unit being indicated in general by the numeral 20 and being directly associated with the turbine. The combustion unit comprises a combustion chamber 21 provided with a refractory lining 22 and preferably supported upon a hollow base or foundation 23. The combustion chamber is provided at its top with an outlet neck 24 somewhat restricted in the direction of its delivery end, which is indicated by the numeral 25, and to this end of the outlet neck there is secured a nozzle 26 having a flared bore 27, the end of which is presented toward and located substantially at the intake end of the inlet 3 to the turbine. A hot point 22' is extended into the combustion chamber to ignite the mixture therein. The nozzle is exteriorly cylindrical and an annular valve member 28 is slidably fitted onto the said nozzle and has connected to it one end of a rod 29, the other end of which rod is connected to an angle lever 30 mounted for rocking movement upon the casing of a thermostat indicated by the numeral 31. A stem 32 is connected to the other arm of the angle lever and extends downwardly through the top of the thermostat casing and is connected to the diaphragm 33 of the thermostat. The thermostat includes a dead air tube 34 which is closed and which extends downwardly from the casing and through the upper side of the intake 2 of the turbine so that the lower portion of the tube will be subjected to the heat from the motive fluid, it being understood that the Venturi opening 3 of the turbine intake and the flared bore 27 of the nozzle 26 form an injector for delivering air into the turbine intake with the motive fluid under conditions which will presently be explained.

It will also be understood at this point, that the thermostat 31 will operate automatically to adjust the valve or damper 28 so as to regulate the volume of air injected into the intake of the turbine.

The invention contemplates the vaporization of a liquid fuel, the vaporization of water to produce steam, the mixing of the vaporized fuel, the steam, and air, and the combustion of the motive fluid thus produced, and utilizing the expanded products of combustion to operate the turbine. The combustion of the gaseous mixture takes place in the combustion chamber 22 and in order to effect combustion of the mixture, a compound injector, indicated in general by the numeral 35, is associated with the said chamber 22. This injector comprises a tubular body 36 secured at its lower end to one side of the combustion chamber 22 with its bore in registration with an opening 37 formed in the said side of the said chamber, and the bore of the injector which is indicated by the numeral 38, is formed with successive double conical reduced portions similar to those present in the bore of a Venturi tube and indicated by the numerals 39, 40 and 41. The numeral 42 indicates a fuel nozzle which is mounted in a suitable supporting bracket 43 upon the exterior of the combustion chamber 22 and the bore of this nozzle is formed with a double conical reduced portion 44 at the delivery end of the nozzle, this end of the nozzle being presented at the intake end of the injector body 36 and likewise at the intake of the reduced portion 39 of the bore of said body. A pipe 45 is connected with the nozzle to supply gaseous or vaporized fuel thereto, and the usual valve 46 is provided for controlling the supply of fuel to the nozzle. As the bore of the nozzle 42 and the double conical portion 39 of the bore of the injector body are of the form stated, air will be drawn into the intake end of the injector when fuel is delivered in the form of a blast from the nozzle 42, and in order that the supply of air may be controlled, a valve member 47 is slidably mounted upon the nozzle 42 and has associated with it an adjusting screw 48, the valve member opposing the intake end of the injector and being adjustable toward and from the said end of the injector through the adjustment of the screw 48. A steam nozzle 49 is mounted in one side of the injector body and has its delivery end 50 presented within the double conical reduced portion 40 of the bore of the injector body, and this nozzle is provided with a needle valve 51 which may be adjusted to control the delivery of steam therefrom. A second steam nozzle, indicated in general by the numeral 52, is provided in connection with the injector and comprises an annular body 53 mounted between two sections of the injector body and provided with a radial bore 54 and with a nozzle tip 55 which is in communication with the inner end of the bore and is presented within the double conical reduced portion 41 of the bore of the injector, this tip being carried by a diametric portion 56 forming an integral part with the annular body 53 of the nozzle. A needle valve 57 is associated with the nozzle to control the delivery of steam therefrom and a pipe 58 is connected with the nozzles 49 and 52 to deliver steam thereto. At this point it will be understood that as gaseous fuel is delivered from the nozzle 42 in a blast, it will be mixed with air drawn in or injected into the bore of the injector body and the mixture of gas and air will be further mixed with steam delivered from the nozzles 49 and 52 and further impelled by the blast of steam so that the entire mixture is delivered in a blast into the combustion chamber 22 where it is ignited and burned continuously. As the gaseous mixture is ignited and burned, it will expand and the expanded products of combustion constitute the motive fluid and are delivered from the combustion unit 20 to the intake of the turbine and there serve to operate the turbine. It will be understood at this point that while the motive fluid issues with great velocity from the outlet of the combustion unit and in a highly heated state, it will be somewhat lowered in temperature through exchange of heat units with the volume of air taken in through the intake 4 of the turbine and its velocity reduced to substantially twice the peripheral speed of the rotor of the turbine.

Figures 3, 4, 6:
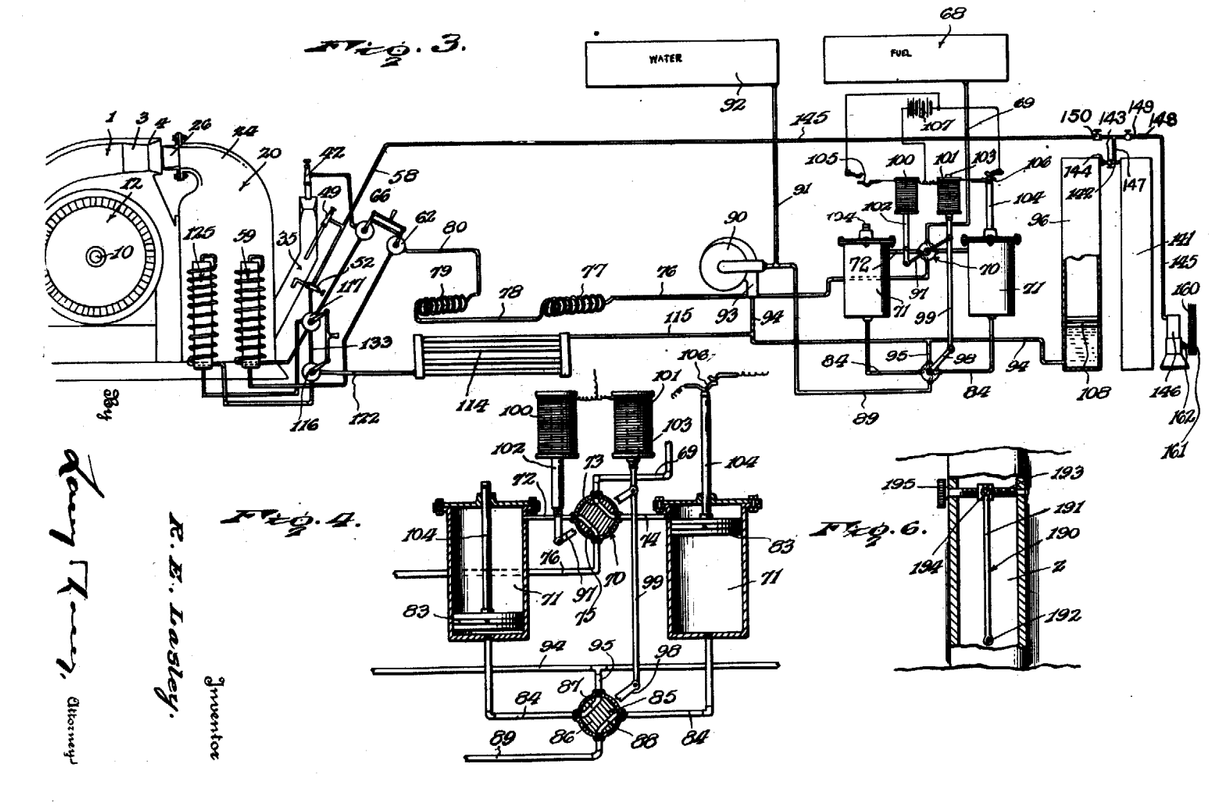
Figure 3 is a schematic view illustrating the power plant embodying the invention.
Figure 4 is a detail vertical transverse sectional view through the liquid fuel supply unit of the apparatus.
Figure 6 is a similar view taken substantially on the line 6—6 of Figure 1, looking in the direction indicated by the arrows.

The numeral 59 indicates in general a liquid fuel vaporizer which comprises a hollow cylindrical chamber 60 preferably mounted at its lower end in the bottom of the combustion chamber 22. Preheated liquid fuel such for example as crude oil, coal oil, or even gasoline, is supplied to the lower end of the chamber 60 of the vaporizer 59 by a pipe 61 which leads from one port of a three-way valve indicated by the numeral 62, and which valve will presently be more specifically referred to. A pipe coil 63 is disposed to surround the vaporizing chamber 60 and one end of this coil, namely the upper end, is connected to the end of the said chamber as indicated by the numeral 64. To the lower end of the vaporizing coil 63 there is connected a pipe 65 which leads to a three-way valve indicated by the numeral 66 and constituting a companion of the valve 62. A pipe 67 leads from another port of the valve 66 to the nozzle 42 and in this manner, gaseous or vaporized fuel is supplied to the nozzle. The invention contemplates a source of liquid fuel supply from which liquid fuel is continuously delivered to the preheating coils and from these coils to the vaporizing unit 59, and the initial source of fuel supply comprises a tank 68 in which the fuel is contained and from which it is conducted by a pipe 69 as best shown in Figure 3 of the drawings, to one port of a four-way valve indicated in general by the numeral 70. The four-way valve 70 is disposed between two fuel supply cylinders indicated by the numeral 71 and a fuel conducting pipe 72 is placed in communication with the upper end of one of the cylinders 71 and with one port of the four-way valve 70, so that when the valve is in the position shown in Figure 4 of the drawings, communication will be established between the pipe 69 which leads from the fuel supply tank 68, by way of a port 73 in the valve body and the pipe 74, to provide for the flow of liquid fuel from the tank into the cylinder with which the pipe 74 is connected. A similar pipe 72 is placed in communication at one end with the upper end of the other cylinder 71 as shown in Figures 3 and 4, and, with the valve 70 in the position shown in Figure 4, is in communication with a port 75 in the valve body, the other end of the port being at such time, in communication with a pipe 76 fitted at one end into one of the valve casing ports and leading to a preheated coil 77 which is arranged within one of the exhaust chambers 17 of the turbine. A pipe 78 extends from the other end of the pipe coil 77 to one end of a companion pipe coil 79 which is arranged within the other exhaust chamber 17, and a pipe 80 is connected with the other end of the preheating coil 79 and at its other end is connected to one of the ports of the three-way valve 62, it being evident by reference to Figure 1 of the drawings that when the three-way valve 62 is adjusted to position its body as shown in said figure, the port 81 in the said body will establish communication between the pipe 80 and the pipe 61 so that the fuel which has been preheated in the coils 77 and 79 will be delivered through the pipe 61 to the body 60 of the vaporizing unit 59. At this point, it will be evident that the heat from the exhaust motive fluid delivered into the exhaust chambers 17 will be utilized, in part, to heat the coils 77 and 79 and thus initially preheat the liquid fuel to a relatively high degree of temperature. Inasmuch as the gaseous fuel which is delivered into the combustion chamber 22 and is ignited produces an intensely hot flame, the vaporizing unit 59 will be intensely heated and the preheated liquid fuel delivered into the chamber 60 and coil 63 thereof will be practically immediately flashed into gas and delivered by way of the pipe 65 and a port 82 in the body of the valve 66, to the pipe 67 and through this pipe to the nozzle 42.

A continuous supply of liquid fuel to the preheating coils is provided for in the following manner. Pistons 83 are arranged to work in the cylinders 71 and water is supplied under pressure to the lower ends of the cylinders and beneath the pistons to successively elevate the pistons and effect discharge of the liquid fuel from the upper portions of the cylinders, under pressure. For this purpose, pipes 84 are connected each at one end to the bottom of a respective one of the cylinders 71 and the pipes at their other ends are connected to the opposite ports of a four-way valve casing indicated in general by the numeral 85. The valve body is indicated by the numeral 86 and is provided with ports 87 and 88. A pipe 89 is led into the bottom of the casing of the valve 85 from the intake of a rotary water pump indicated by the numeral 90, and a pipe 91 is connected with the pipe 89 and leads from a source of water supply, as for example a water tank 92. The outlet of the pump 90 is indicated by the numeral 93, and a pipe 94 is connected thereto and has a branch 95 connected to the upper side of the casing of the valve 85, the pipe 94 being extended and placed in communication with the bottom of a pressure tank indicated by the numeral 96, and which tank will presently be more specifically described. By reference to Figures 3 and 4 of the drawings, it will be observed that the valves 70 and 85 are provided with arms 97 and 98 fixed upon their stems, respectively, and that a connection 99 is provided between one end of the arm 97 and the end of the arm 98, so that the valve bodies will be rotated in unison. Solenoids 100 and 101 are arranged preferably above the cylinders 71, and the core 102 of the solenoid 100 is connected to the other end of the valve arm 97, the core 103 of the other solenoid 101 being connected to the first mentioned end of the said arm 97. The pistons 83 are provided with stems 104 which extend through the heads of the cylinders 71 and are designed to coact with circuit closing devices 105 and 106 respectively associated with the solenoids 100 and 101, these circuit closing devices, when engaged by the respective piston stems 104, being so arranged as to close a circuit including the solenoids 100 and 101 and a source of current supply 107, so that such time the respective solenoid will be energized, its core elevated, and rocking motion imparted to the valve arms 97 and 98 to effect simultaneous and corresponding rotation of the valve bodies. The parts being in the positions shown in Figures 3 and 4 of the drawings, the piston 83 in the right hand one of the cylinders 71 has reached the limit of its upward movement and, through actuation of the circuit closing device 106 and energization of the solenoid 101, the bodies of the valves 70 and have been rotated to the positions illustrated particularly in Figure 4. With the valve 70 in the position shown, fuel is permitted to flow from the tank 68 through the pipe 69 and port 73 and pipe 74 into the upper end of the cylinder 71 at the right of the said figure, and water is being exhausted from the lower portion of this cylinder by way of the pipe 84, valve 48, pipe 89, and intake of the pump 90, so that the piston 83 in the cylinder is at the same time being lowered. On the other hand, water under pressure is being admitted to the lower end of the left hand cylinder 71 by way of the pipe 94, its branch 95, the valve port 87, and the pipe 84, and the piston in this cylinder is being elevated, thereby forcing the liquid fuel from the cylinder under pressure through the pipe 72, the valve port 75, and pipe 76, to the preheating coils 77 and 79. It will be evident at this point that when the piston in the left hand cylinder has reached the limit of its upward movement and substantially all of the liquid fuel has been discharged from the cylinder, the circuit closing device 105 will be actuated to close the circuit through the solenoid 100 and draw the core 102 thereof upwardly to rotate the bodies of the valves 70 and 85, thus placing the upper end of the left hand cylinder 71 in communication with the source of oil or fuel supply by way of the pipe 69, port 75, and pipe 72, and placing the lower end of this cylinder in communication with the exhaust side of the water pump 90 by way of the pipe 84, port 88, and pipe 89. At the same time, water under pressure will be admitted to the pipe 94, its branch 95, port 87, and pipe 84, to the lower end of the right hand cylinder 71, effecting upward movement of the piston to deliver the liquid fuel under pressure from the cylinder through the pipe 74, the port 73, and pipe 76, to the preheating coils 77 and 79. It will be evident that this operation is automatic and continuous so that there is an uninterrupted supply of liquid fuel to the preheating coils.

A float piston 108 works in the pressure cylinder 96 and as the upper end of this cylinder is normally closed above the piston, the air trapped therein will be placed under pressure due to the delivery of water under pressure to the lower portion of the cylinder 108 by way of the pipe 94. By reason of this arrangement, there is a reserve supply of water in the pressure tank 96 under air pressure and when the power plant is first set in operation, advantage is taken of this auxiliary supply, the pump 90 being preferably driven from the turbine shaft 10 by arranging a worm 109 upon this shaft at an extended end portion thereof and meshing with the worm is a worm pinion 110 upon a countershaft 111 mounted in an extension 112 of the turbine casing, which shaft 111 is the shaft of the pump, the blades of the pump being indicated by the numeral 113 and the pump arrangement being best illustrated in Figure 2 of the drawings.

The water supply tank 92 and pump 90 serve not only to actuate the pistons 83 of the fuel feeding cylinders, but these parts serve the further purpose of supplying water to the steam generating unit of the plant. The steam generating unit includes a bank of coils 114 arranged within the enclosed exhaust space 19 of the turbine, which space is open at its opposite sides so that the coils will be subjected to the exhaust products of combustion. A water supply pipe 115 leads from the pipe 94 to the intake of the coil bank 114 and conducts water to the said coil bank from the pump 90. The numerals 116 and 117 indicated in general, two companion cutoff valves, the bodies 118 and 119 of which are provided respectively with ports 120 and 121. A pipe 122 leads from the coil bank 114 to one of the ports of the casing of the valve 116, and a pipe 123 leads from the other port of the casing to the lower end of the pipe coil 124 of a water vaporizing unit indicated in general by the numeral 125. The unit 125 is located within the combustion chamber 22 of the combustion unit 20 in juxtaposition to the fuel vaporizing unit 59 and comprises a cylindrical chamber 126 corresponding to the chamber 60 and to the upper end of which chamber there is connected the upper end of the coil 124. A pipe 127 leads from the lower end of the chamber 126 to one of the ports of the casing of the valve 117, and the pipe 58 is connected to the other port of the valve casing. Arms 128 and 129 are connected to the stems of the valve bodies 118 and 119 respectively, and these arms are connected to each other by a connecting bar 131 provided with a handle 132 whereby the valves may be simultaneously manually adjusted. At this point it will be evident that water delivered by the pump 90 to the coil bank 114 will be heated to a relatively high degree while passing through the bank of tubes and will be conducted by the pipe 122, valve port 120, and pipe 123, to the vaporizing unit 125, where it will be immediately flashed into steam for delivery to the nozzles 52 and 49 by way of the valve 117. A pipe 133 establishes communication between the casings of the valves 116 and 117, and the body of the valve 117 is provided with a diametric port 134 which may be brought into alinement with the said pipe 133 and the connected end of the pipe 58 in the rotative adjustment of the valve body 119, the port 120 being at such time brought into communication at its ends with the pipe 133 and the pipe 122 through rotation of the valve body 118 and a direct supply of steam from the pipe 122 to the nozzles 49 and 52 in this manner established.

Figures 1, 5:
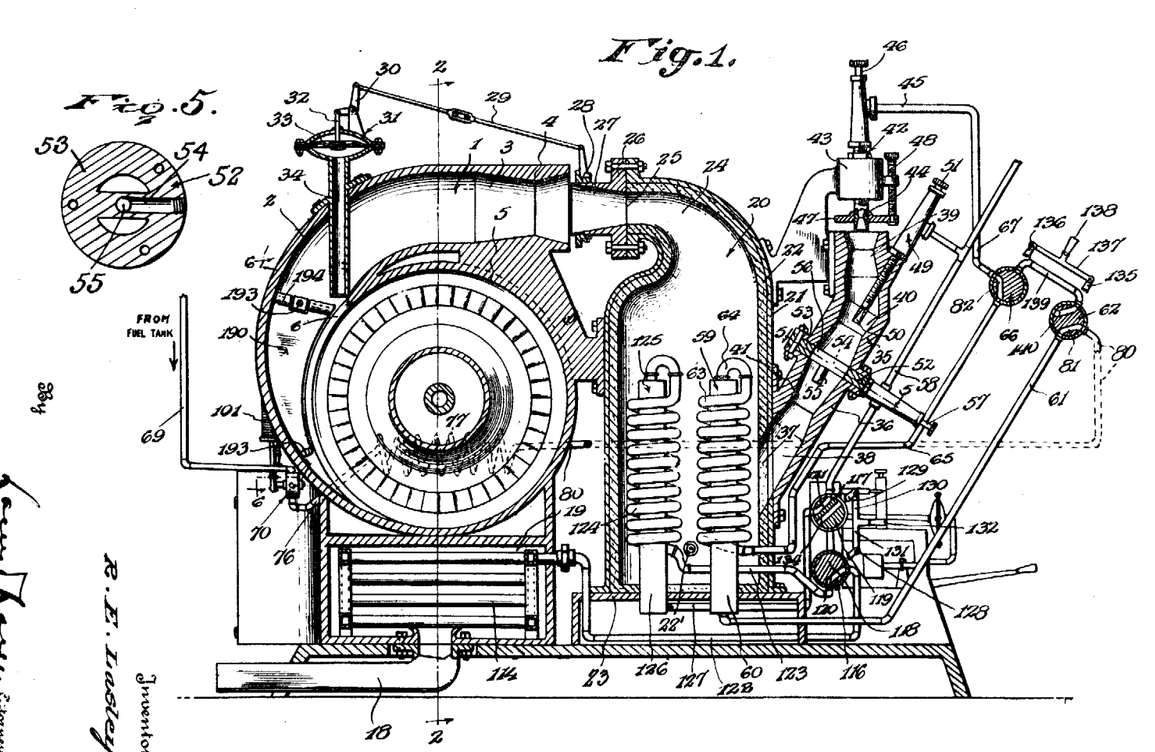
Figure 1 is a vertical front to rear sectional view through a turbine and a portion of the motive fluid generating apparatus embodying the invention.
Figure 5 is a detail sectional view taken substantially on the line 5—5 of Figure 1, looking in the direction indicated by the arrows.

Arms 135 and 136 are fixed upon the stems of the valve bodies 62 and 66 respectively, and are connected by a connecting bar 137 provided with a handle 138 whereby the valve bodies may be rotatably adjusted. A pipe 139 extends between the valves 62 and 66 and is placed in communication with the valve casings, and the body of the valve 62 is provided with a port 140, as shown in Figure 1. At this point it will be evident that when the valves 62 and 66 are adjusted as shown in Figure 1, gaseous fuel, at a high temperature, will be supplied to the nozzle 42, but by adjusting the valve through the medium of the handle 138, the port 140 may be brought into registration at its ends with the pipe connections 80 and 139 and the port 82 of the valve 66 may be brought into registration at its ends with the pipe connections 139 and 67 so as to provide for a direct delivery of oil from the coils 77 and 79 to the said nozzle 42.

Figures 2, 7:
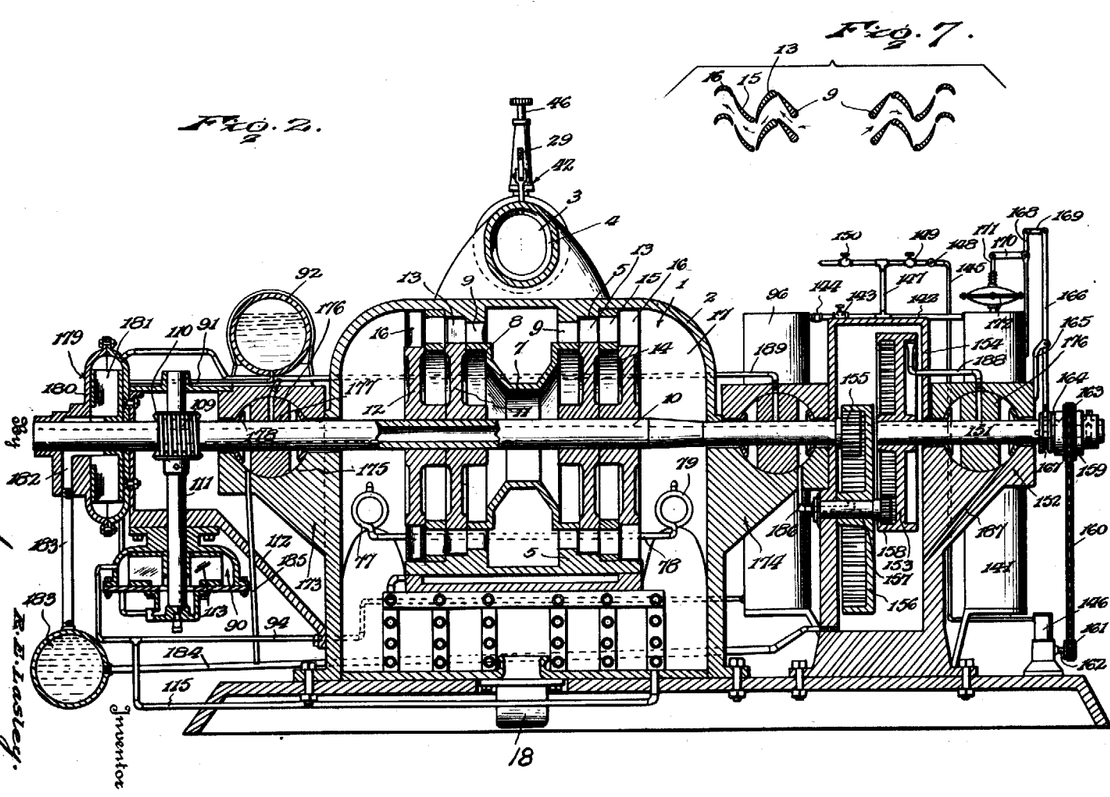
Figure 2 is a vertical longitudinal sectional view taken substantially on the line 2—2 of Figure 1, looking in the direction indicated by the arrows.
Figure 7 is a schematic view illustrating the arrangement of the blades of the turbine.

It is desirable to employ, in addition to the pressure tank 96, an auxiliary pressure tank which is illustrated in Figures 2 and 3 of the drawings, and indicated by the numeral 141. A pipe 142 establishes connection between the upper ends of the tanks 96 and 141, and a cut-off valve 143 is interposed in the pipe 142 and may be opened to permit of the discharge of air under pressure from the auxiliary tank 141 into the tank 96, a check valve 144 being interposed in the pipe 142 between the valve 143 and tank 96 to prevent any escape of air from the tank 96 into the tank 141 should the pressure in the former tank be greater than the pressure in latter. A pipe 145 leads from an air compressor 146 and is connected by a branch 147 with the pipe 142 at a point between the valve 143 and the tank 141, a check valve 148 being interposed in the pipe 145 to prevent any back flow of air under pressure delivered to the tank 141 from the compressor 146, and a cut-off valve 149 being likewise interposed in the pipe 145 between the check valve 148 and the branch 147. A similar cut-off valve 150 is likewise interposed in the pipe 145 beyond the branch 147, and the said pipe is continued to and connected with the pipe 58, as shown in Figure 3 of the drawings, so that air under pressure may be delivered to the nozzles 49 and 52 when occasion requires.

The compressor 146 is driven in a manner which will now be explained. The numeral 151 indicates a shaft which is rotatably mounted in a bearing 152 and which carries an internal gear 153 mounted upon the inner end of the shaft, which end of the shaft extends into a gear casing 154 located at one end of the shaft 10. The said end of the shaft 10 extends into the gear casing and a pinion 155 is fixed upon the said end of the shaft and meshes with an internal gear 156 which is rotatably journaled upon a stub shaft 157 mounted upon one wall of the gearing casing 154. A pinion 158 is fixed for rotation with the shaft 157 and internal gear 156, and meshes with the internal gear 153. By this system of gearing, rotary motion at a reduced rate of speed is imparted from the shaft 10 to the shaft 151. A sprocket gear 159 is loosely mounted upon the outer end of the shaft 151 and a sprocket chain 160 is trained about this gear and about a sprocket gear 161 upon the shaft 162 of the compressor 146. A clutch member 163 is associated with the sprocket gear 159 and rotates therewith, and another clutch member 164 is splined upon the shaft 151 and is movable into and out of coactive engagement with the clutch member 163, it being understood that when the members are in mutual engagement, rotary motion will be imparted to the sprocket 159 and transmitted by the chain 160 to the compressor 146. A bracket 165 is mounted upon the bearing 152 and a rock bar 166 is supported for rocking movement by this bracket and is provided at its lower end with a yoke 167 coacting with the clutch member 164. The upper end of the rock bar 166 is connected to one arm of an angle lever 168, by a link 169, and the other arm 170 of this lever is connected to the stem 171 of a pressure control cut-out 172, the casing of which is placed in communication with the upper end of the auxiliary pressure tank 141. At this point, it will be understood that when the cut-off valve 150 is closed and the valve 149 is open, and the compressor 146 is in operation, air under pressure will be forced into the auxiliary pressure tank 141 and this supply of air will continue until the pressure in the tank has reached a predetermined point for which the pressure operated cut-out 172 has been set, whereupon the cut-out will operate to rock the lever 168 and the bar 166 to shift the clutch member 164 out of engagement with the clutch member 163 and thus discontinue the operation of the compressor. If additional pressure is required in the tank 96, the valve 143 may be opened until the desired pressure has been reached.

It will be understood from the foregoing that air may be delivered by the pipe 145 to the nozzles 49 and 52, when commencing the operation of the plant and, mixed with the fuel, will form a combustible mixture which may be ignited to heat the vaporizing units 59 and 125, the generation of steam being effected in a few moments' time and the fuel being vaporized and mingled with the steam and ignited to operate the turbine.

The shaft 10 is journaled in bearings 173 and 174 located at the opposite sides of the turbine casing 2, and these bearings and the bearing 152 are of substantially identical construction, each bearing being in the form of a casting having a substantially spherical bearing chamber 175 formed therein and housing a bearing element 176 which has the contour of a flat-sided segment of a sphere so that its circumferential surface smoothly fits the wall of the chamber 175, the bearing element 176 having an opening 177 to acommodate the shaft 10 or shaft 151, as the case may be. Concavo-convex discs 178 are fitted to the shaft and serve to prevent leakage of lubricant through the openings in the bodies of the bearings through which the shafts extend, so that each chamber 175 is designed to contain a quantity of lubricant to lubricate the respective bearings. The numeral 179 indicates an oil pump including a casing 180 which is mounted upon one side of the bearing 173, and the rotor of this pump, indicated by the numeral 181, is fixed upon the adjacent end of the shaft 10 for rotation therewith. The intake of the pump is indicated by the numeral 182, and a pipe 183 leads to the intake from an oil storage tank 183. A pipe 184 leads to and is placed in communication with one side of the tank 183 and is likewise placed in communication at one end, with the bottom of the gear casing 154, a pipe 185 leading from the bearing chamber 175 of the bearing 173 to the said pipe 184, and a pipe 186 being led from the bearing chamber of the bearing 174 to the said gear casing 154. Likewise, the bearing 152 is provided with an oil duct 187 which leads from its bearing chamber 175 and communicates with the interior of the gear casing 154. An oil supply pipe 188 communicates with the chamber of the bearing 152 and has its intake end located within the peripheral bounds of the internal gear 153 so that lubricant taken up by this gear may be splashed into the intake end of the pipe and conducted to the bearing element 176 of the said bearing 152. An oil conducting pipe 189 is placed in communication with the bearing chambers of the bearings 173 and 174 and connects with the outlet of the pump 179. In this manner, provision is made for lubrication of all of the bearings and for return of the lubricant from the several bearings to the storage tank 183. It will be evident that the bearing elements 176 have more or less freedom of movement in their respective bearing chambers so that any tendency of the shaft to run unevenly due to any one of various causes, will be compensated for by the automatic adjustment of the bearing elements in their respective chambers.

It will be observed by reference to Figure 7 of the drawings, that the arrangement of the vanes 9 and 15, and blades 13 and 16 is such that ordinarily, the motive fluid will be supplied to the blades of the rotor in such a manner as to tend to shift the shaft in opposite directions, with the result that the shaft is evenly balanced and the rotor will, therefore, rotate truly and accurately and with less friction. However, in order to provide against any uneven lateral thrust of the shaft in either direction because of uneven distribution of the fluid, a deflector, indicated in general by the numeral 190, is arranged within the intake 2 of the turbine and comprises a deflector plate which is indicated by the numeral 191 and of substantially the arcuate form shown in Figure 1 of the drawings and hingedly mounted at its lower end as at 192, whereby its upper portion may be shifted toward either side of the inlet to distribute the motive fluid in greater volume to one side of the rotor than to the other or, in the intermediate position of the deflector plate, evenly distribute said fluid. In order that the deflector plate 191 may be conveniently adjusted, a threaded spindle 193 is rotatably journaled at its ends in the opposite side walls of the inlet 2 of the turbine and a block 194 is provided with a threaded opening through which this spindle extends and is swiveled in a recess in the upper end edge of the said plate. A hand wheel 195 is provided upon one end of the spindle 193, exteriorly of the intake 2, whereby the spindle may be rotated to effect longitudinal adjustment of the block 194 therealong and thus adjust the said plate 191 in the manner stated.

Having thus described the invention, what I claim is:

1. In a power plant, a motor, a combustion chamber independent of the motor, an injector body communicating with the combustion chamber and having an open upper end, members mounted in the combustion chamber for generating steam and vaporizing fuel, a pair of nozzles disposed in the injector body and vertically spaced for admitting steam into the body, a fuel nozzle discharging into the open end of the body, means for regulating the flow of steam and fuel to the respective nozzles, and means for conducting the products of combustion from the combustion chamber to the motor.

2. In a power plant, a motor, a combustion chamber independent of the motor, an injector body of venturi formation communicating with the combustion chamber, vertically spaced steam admitting nozzles located in the body, a fuel nozzle discharging into the upper end of the body, means for admitting atmospheric air into the upper end of the body at the point of discharge of the fuel nozzle, a steam generator in the combustion chamber for supplying steam to the steam nozzles, a fuel vaporizer in the combustion chamber for furnishing vaporized fuel to the fuel nozzle, the mixture of steam and fuel in the injector body being discharged for ignition in the combustion chamber, and means for conducting the products of combustion from the combustion chamber to the motor.

3. In a power plant, a motor, a combustion chamber, an injector body consisting of sections and having an open upper end, an annular body fitted between the sections of the injector body and having a steam injecting nozzle depending into the ejector body intermediate its ends, a second steam injecting nozzle extending into the injector body above the first named nozzle, a steam generator mounted in the combustion chamber for supplying said nozzle, a fuel nozzle discharging into the open end of the injector body, the fuel for said nozzle and the steam for the second nozzle passing through said annular body for discharge with the steam from the first named nozzle into the combustion chamber, a fuel vaporizer in the combustion chamber for supplying the fuel nozzle, and means for conducting the products of combustion from the combustion chamber to the motor.

In testimony whereof I affix my signature.

ROBERT E. LASLEY. [L. S.]

CERTIFICATE OF CORRECTION.

Patent No. 1,777,097.    Granted September 30, 1930, to

ROBERT E. LASLEY.

It is hereby certified that the name of the assignee in the above numbered patent was erroneously written and printed as "Marvin C. Tonger", whereas said name should have been written and printed as Marvin C. Fonger, as shown by the records of assignments in this office; and that the said Letters Patent should be read with this correction therein that the same may conform to the record of the case in the Patent Office.

Signed and sealed this 28th day of October, A. D. 1930.

M. J. Moore,
Acting Commissioner of Patents.

(Seal)

above the first named nozzle, a steam generator mounted in the combustion chamber for supplying said nozzle, a fuel nozzle discharging into the open end of the injector body, the fuel for said nozzle and the steam for the second nozzle passing through said annular body for discharge with the steam from the first named nozzle into the combustion chamber, a fuel vaporizer in the combustion chamber for supplying the fuel nozzle, and means for conducting the products of combustion from the combustion chamber to the motor.

In testimony whereof I affix my signature.

ROBERT E. LASLEY. [L. S.]

CERTIFICATE OF CORRECTION.

Patent No. 1,777,097.    Granted September 30, 1930, to

ROBERT E. LASLEY.

It is hereby certified that the name of the assignee in the above numbered patent was erroneously written and printed as "Marvin C. Tonger", whereas said name should have been written and printed as Marvin C. Fonger, as shown by the records of assignments in this office; and that the said Letters Patent should be read with this correction therein that the same may conform to the record of the case in the Patent Office.

Signed and sealed this 28th day of October, A. D. 1930.

M. J. Moore,
Acting Commissioner of Patents.

(Seal)